(12) United States Patent
Fisher

(10) Patent No.: US 11,937,567 B2
(45) Date of Patent: *Mar. 26, 2024

(54) RETRACTABLE CURTAIN FOR LIVESTOCK STRUCTURES

(71) Applicant: Shady Lane Curtains, LLC, Bird-in-Hand, PA (US)

(72) Inventor: Samuel Fisher, Bird-in-Hand, PA (US)

(73) Assignee: Shady Lane Curtains, LLC, Bird-In-Hand, PA (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/464,059

(22) Filed: Sep. 1, 2021

(65) Prior Publication Data

US 2021/0392844 A1 Dec. 23, 2021

Related U.S. Application Data

(63) Continuation of application No. 14/995,765, filed on Jan. 14, 2016, now Pat. No. 11,134,652.

(51) Int. Cl.
| | |
|---|---|
| *A01K 1/00* | (2006.01) |
| *E06B 9/13* | (2006.01) |
| *E06B 9/174* | (2006.01) |
| *E06B 9/264* | (2006.01) |
| *E06B 9/42* | (2006.01) |
| *E06B 9/58* | (2006.01) |
| *E06B 9/62* | (2006.01) |
| *E06B 9/64* | (2006.01) |
| *E06B 9/66* | (2006.01) |
| *E06B 9/78* | (2006.01) |
| *E06B 9/24* | (2006.01) |

(52) U.S. Cl.
CPC ............... *A01K 1/007* (2013.01); *E06B 9/13* (2013.01); *E06B 9/174* (2013.01); *E06B 9/264* (2013.01); *E06B 9/42* (2013.01); *E06B 9/58* (2013.01); *E06B 9/62* (2013.01); *E06B 9/64* (2013.01); *E06B 9/66* (2013.01); *E06B 9/78* (2013.01); *E06B 2009/2405* (2013.01); *E06B 2009/583* (2013.01)

(58) Field of Classification Search
CPC .......... A01K 1/007; E06B 9/264; E06B 9/42; E06B 9/58; E06B 9/64; E06B 9/66; E06B 9/78; E06B 9/62; E06B 9/174; E06B 9/13; E06B 2009/2405; E06B 2009/583
See application file for complete search history.

(56) References Cited

U.S. PATENT DOCUMENTS

| | | | |
|---|---|---|---|
| 2,702,081 A | 2/1955 | North et al. | |
| 3,741,631 A | 6/1973 | Laing | |
| 4,244,417 A | 1/1981 | Taylor | |
| 4,712,598 A * | 12/1987 | Bonacci | E06B 9/262 160/327 |

(Continued)

*Primary Examiner* — Beth A Stephan
(74) *Attorney, Agent, or Firm* — Barley Snyder

(57) ABSTRACT

A retractable curtain system is provided and includes a curtain support system, a curtain, and a retraction system. The curtain support system includes a pair of outer walls and an upper frame to provide a curtain receiving space. The curtain covers the curtain receiving space and includes a first non-transparent panel and transparent panel connected to the first non-transparent panel. The retraction system is connected to the curtain to lower and raise the transparent panel.

15 Claims, 8 Drawing Sheets

(56) References Cited

U.S. PATENT DOCUMENTS

| | | |
|---|---|---|
| 5,107,917 A | 4/1992 | Larsson |
| 5,353,858 A | 10/1994 | Hartmann |
| 5,520,236 A | 5/1996 | Thomas et al. |
| 5,813,599 A | 9/1998 | Hoff |
| 6,042,475 A | 3/2000 | Darden |
| 6,155,326 A | 12/2000 | Imhoff et al. |
| 6,612,359 B1 | 9/2003 | Moreau |
| 7,624,783 B2 | 12/2009 | Sensenig |
| 8,820,387 B2 | 9/2014 | Zettl |
| 11,134,652 B2 * | 10/2021 | Fisher ................... E06B 9/13 |
| 2007/0193698 A1 | 8/2007 | Kraeutler |
| 2014/0338277 A1 | 11/2014 | Dimmer et al. |
| 2020/0308733 A1 | 10/2020 | Byun |

* cited by examiner

RETRACTABLE CURTAIN FOR LIVESTOCK STRUCTURES

CROSS-REFERENCE TO RELATED APPLICATIONS

This application is a continuation of U.S. non-provisional patent application Ser. No. 14/995,765, filed on Jan. 14, 2016, the contents of which are incorporated herein by reference.

FIELD OF THE INVENTION

The invention relates to a retractable curtain and, more particularly, to a retractable curtain system for livestock structures.

BACKGROUND

Modern livestock management practices typically make use of structures in which to house and shelter livestock for at least a portion of time. The structures offer protection from environmental conditions such as temperature, sun exposure, precipitation, wind, and dust that are harmful or stressful to the livestock. The structures typically possess a roof that covers the structure. Where the structure is constructed with open walls, retractable curtain systems are typically positioned at the open walls. The curtain systems may be extended or not as dictated by environmental conditions. The unrolling or extending of curtain systems, while limiting the entry of undesired environmental factors listed above, have the concurrent effect of limiting the amount of natural light reaching the interior of the structure. The limited light reduces the ability of workers or automated surveillance systems, either from inside or outside of the structure, to visually inspect the livestock and conditions contained within the structure. Furthermore, the limited light also may negatively affect the livestock held in the structure. The limited light may also increase the need for artificial light and thus increase energy costs.

As livestock operations grow, the size of the structures containing livestock may grow in square footage to accommodate larger herds. The increased dimensions of the structure affect the amount and reach of light entering into the interior of the structure. Efficient management of these larger structures is a challenge that requires a curtain system that admits light, limits energy use, and is easy to install, operate, and maintain.

SUMMARY

A retractable curtain system is provided and includes a curtain support system, a curtain, and a retraction system. The curtain support system includes a pair of outer walls and an upper frame to provide a curtain receiving space. The curtain covers the curtain receiving space and includes a first non-transparent panel and a transparent panel connected to the first non-transparent panel. The retraction system is connected to the curtain to lower and raise the transparent panel.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
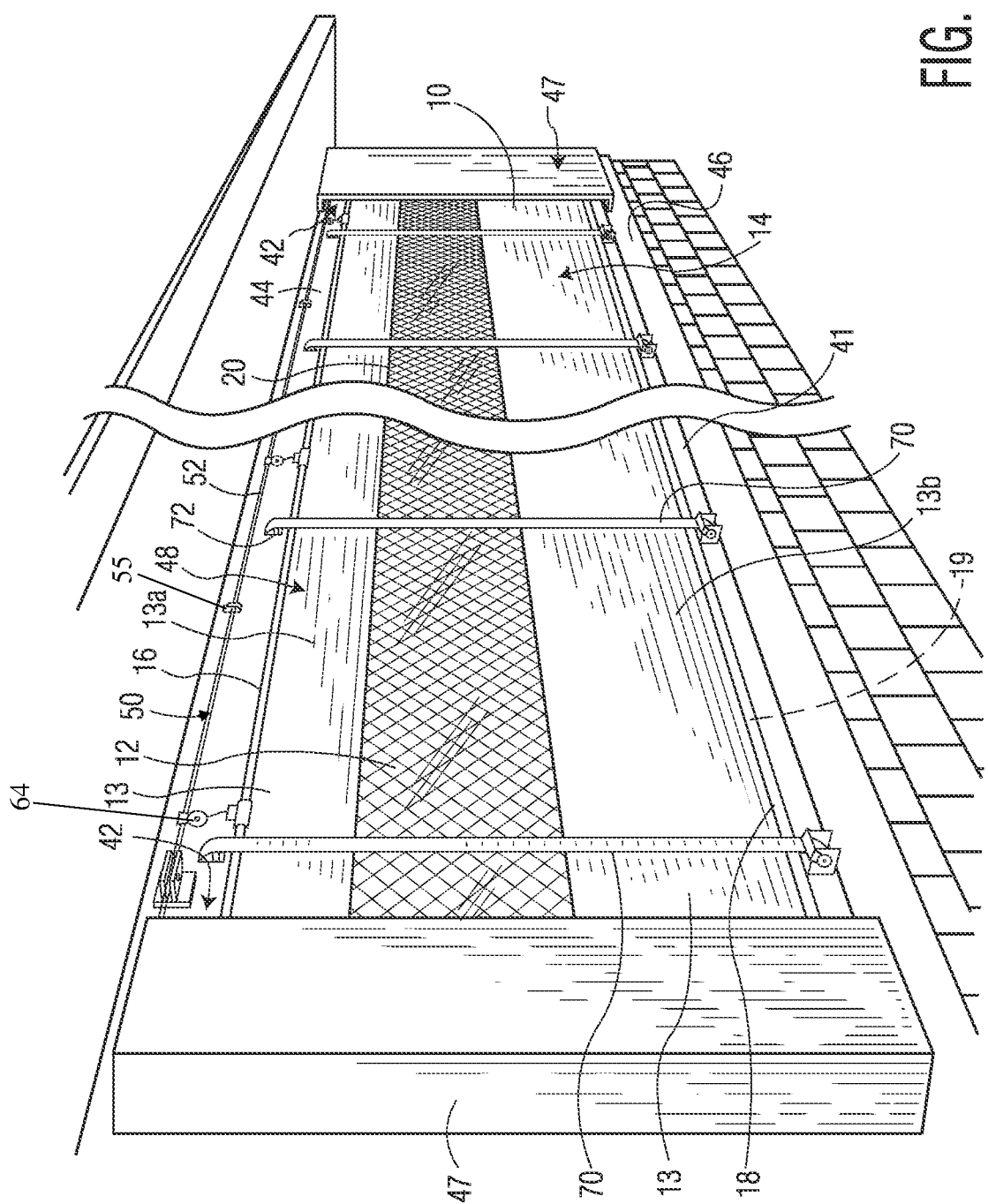
FIG. 1 is a perspective view of a retractable curtain system according to the invention.

With reference to the accompanying drawings, an embodiment of the invention is directed to a curtain system according to the invention will be described.

With reference to FIGS. 1-6, a retractable curtain assembly 10 according to the invention is shown. The retractable curtain assembly 10 includes the following major components: a retractable curtain 14, a curtain support system 40, and a retraction system 50.

Now with reference to FIGS. 1-4 the retractable curtain assembly 10 will be described. As shown, the retractable curtain assembly 10 includes a curtain 14, an upper curtain support 16, and a lower curtain support 18.

Figure 2:
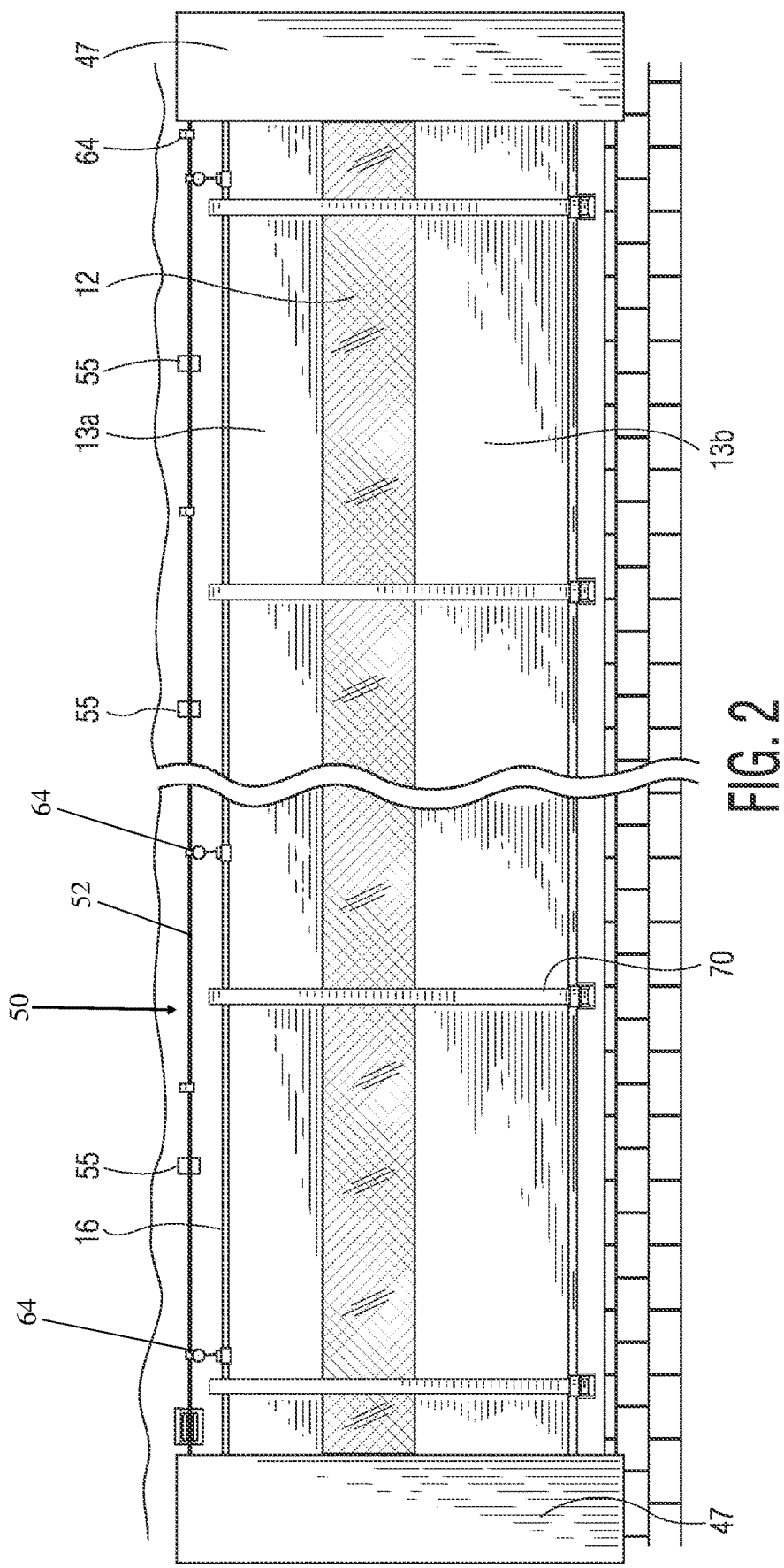
FIG. 2 is a front view of the retractable curtain system of FIG. 1.
Figure 3:
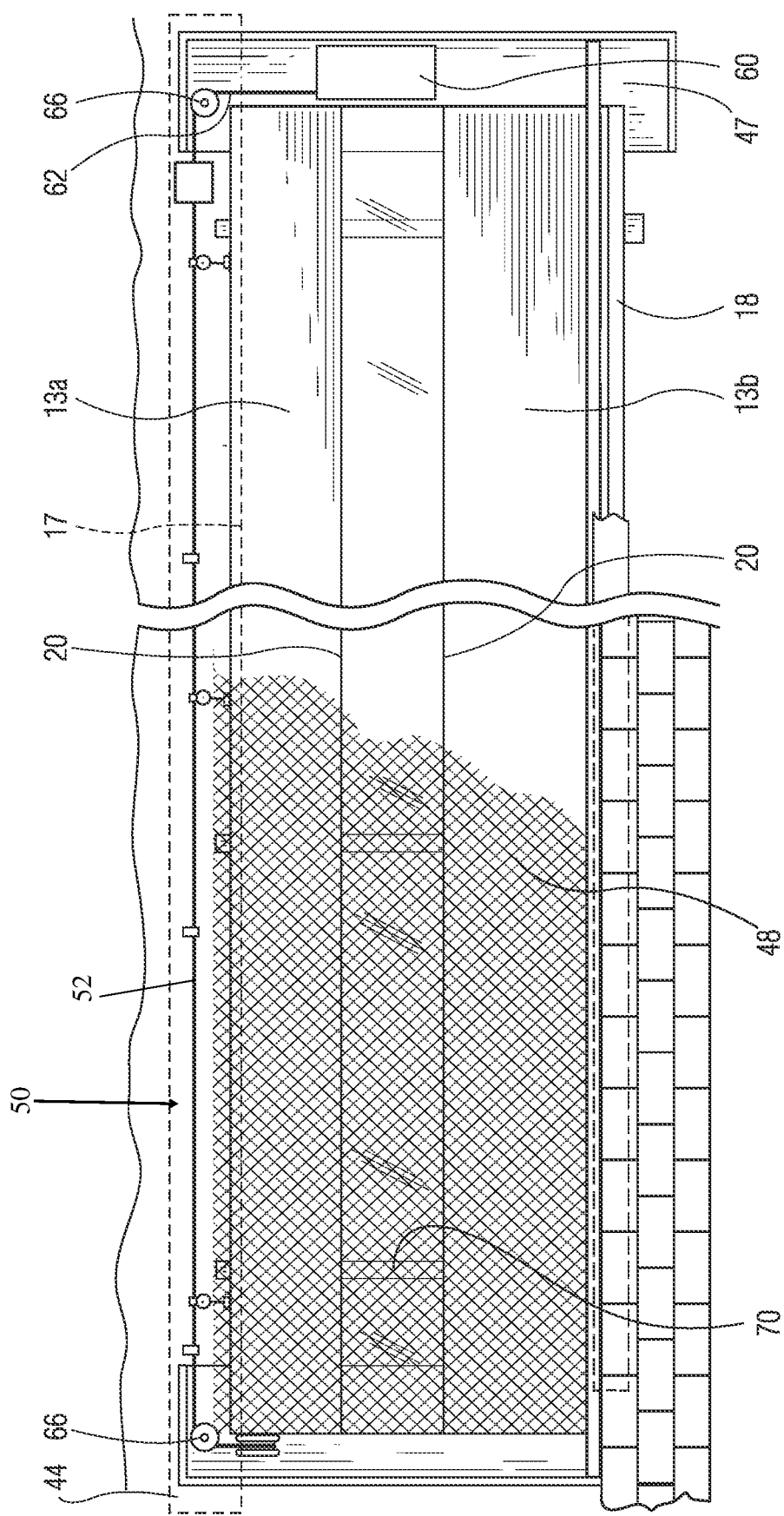
FIG. 3 is a rear view of the retractable curtain system of FIG. 1.

As shown in FIGS. 1-3, the curtain 14 includes at least one or more non-transparent panels 13 and a transparent panel 12 attached to the one or more non-transparent panels 13. The transparent and non-transparent panels 12, 13 are joined or seamed 20 to each other and arranged in generally horizontal and alternating order. One of skill in the art will know appropriate seaming and joining techniques for the materials chosen for the transparent and non-transparent panels 12, 13. In the embodiment shown, the transparent panel 12 and non-transparent panels 13a and 13b are attached to each other in such an order that light is introduced into the structure through the transparent panel 12.

The transparent panel 12 is a sheet of material sufficiently transparent to allow the passage of light. Non-limiting examples of material suitable for the transparent panel 12 include plastic materials known to those of skill in the art. In particular, the transparent panel 12 has a haze less than 4.5% and light transmittance greater than 90%, both when tested according to ASTM 1003-00.

The non-transparent panel 13 is also a sheet of plastic film or fabric material. In particular, in the embodiment shown, the non-transparent panel 13 is opaque. However, one skilled in the art should appreciate that the non-transparent panel 13 could also be a translucent material which transmits light, though at a transmission rate less than that of the transparent panel 12.

Many suitable materials are known and available. The material chosen for the panels 12, 13 may additionally be abrasion-resistant, weatherable, and dimensionally stable. The joined transparent panel 12 and the non-transparent panel 13 are preferably comprised of materials sufficiently strong and flexible to allow the curtain 14 to be rolled into a cylindrical shape without cracking or fracturing as conditions warrant.

In the shown embodiment, the curtain 14 includes a pair of non-transparent panels 13a and 13 b and a transparent panel 12 positioned between the pair of non-transparent panels 13. More particularly, a first non-transparent panel 13a is provided and is a rectangular section of material positioned along an upper half of the curtain 14. A second non-transparent panel 13b is also provided and is a rectangular section of material that is positioned along a lower half of the curtain 14. In the embodiment shown, the first non-transparent panel 13a and the second non-transparent panel 13b have the same width, but the second non-transparent panel 13b has greater height than the first non-transparent panel 13a. The transparent panel 12 is also a rectangular section of material that positioned between the first and second non-transparent panels 13a, 13b. An upper surface of the transparent panel 12 is connected to a lower surface of the first non-transparent panel 13a, while a lower surface of the transparent panel 12 is connected to an upper surface of the second non-transparent panel 13b. The transparent panel 12 may be connected to the non-transparent panels 13a, 13b using known fastening mechanisms, including stitching, welding, adhesives, etc. One skilled in the art should appreciate that the curtain 14 may be designed differently than shown, and the non-transparent panel 13 and the transparent panel 12 may be arranged in different configurations.

The upper curtain support 16 is rigid and strong enough to support the curtain 14 and the lower curtain support 18. As a result, the upper curtain support 16 can be any suitable cylindrical tubing, e.g., an aluminum extrusion, or another metal or a reinforced plastic material. Likewise, the lower curtain support 18 can be any suitable cylindrical tubing, e.g., an aluminum extrusion, or another metal or a reinforced plastic material. The lower curtain support 18 can be weighted to maintain the curtain 14 in an upright position, with the weight of the lower curtain support 18.

One skilled in the art should appreciate that the size and shape of the upper curtain support 16 and the lower curtain support 18 could take other known shapes and be prepared from other known materials.

In the shown embodiment, the curtain 14 further includes an upper support receiving passageway 17 to receive the upper curtain support 16 and a lower support receiving passageway 19 to receive the lower curtain support 18. The upper support receiving passageway 17 is formed by looping and stitching an upper seam of the curtain 14 to a surface of the curtain 14. Likewise, the lower support receiving passageway 19 is formed by looping and stitching a lower seam of the curtain 14 to the surface of the curtain 14. Both the support receiving passageway 17 and the support receiving passageway 19 are tubular passageways in the shown embodiment that are sized to receive the upper curtain support 16 and the lower curtain support 18 respectively.

Now with reference to FIG. 1-4, the curtain support system 40 will be described.

As shown, the curtain support system 40 includes a pair of outer walls 42, an upper frame 44, a lower frame 46, and a curtain receiving space 48. The pair of outer walls 42 are separately positioned on opposite side from one another with the upper frame 44 and the lower frame 46 extending there between. The curtain receiving space 48 is provided between the pair of outer walls 42, the upper frame 44, and the lower frame 46.

The curtain support system 40 also optionally includes left and right covers 47 which conceal the edges of the curtain receiving space 48. These covers 47 may be hinged doors that open when necessary.

Since livestock structures can be of such a size that the structures may include a plurality of window framings 41 formed along the curtain receiving space 48 between the upper frame 44 and the lower frame 46. These window framings 41 allow the passage of air to ventilate the structures. In certain embodiments, these window framings 41 are formed in a similar, generally rectilinear shape and are positioned in a side-to-side configuration between opposite ends of the structure. A person of skill in the art will recognize that the structures may be fabricated from a variety of materials and still be in keeping with the scope of the invention. As required by the particular livestock sheltered, the structure may have one or more door or other access that permit the livestock to enter or leave and allow workers to enter and leave to care for and feed the livestock.

Now with reference to FIG. 1-6, the retraction system 50 will be described.

While an embodiment is shown, the retraction system 50 is used to roll and unroll the curtain 14 and any known hoisting system known to the art would be sufficient.

In the shown embodiment, the retraction system 50 includes an upper support rod 52, and a lifting mechanism 60.

As shown in the Figures, the upper support rod 52 is a structural member, such a pole, positioned along and fixed to the upper frame 44. In the shown embodiment, the upper support rod 52 is tubular and secured to the upper frame 44 using a bracket or similar known device shown, the lifting mechanism 60 is a winch, or the like, such as a windlass, for raising and lowering the curtain 14. The lifting mechanism 60 in this embodiment is shown as being hand-cranked, but in other embodiments it may be electrically or pneumatically operated. The lifting mechanism 60 includes a plurality of hoisting cables 62 that runs from the lifting mechanism 60 for raising and lowering the curtain 14. Here there are one or more sheaves 64 attached onto the upper support rod 52, and the hoisting cables 62 passes through one of each. The cable 62 passes through the inside of the upper support rod 52 and connects to the curtain 14 and, in particular, the upper curtain support 16. Additionally, pulleys 66 are between the upper support rod 52 and the upper curtain support 16, and guide the hoisting cable 62. Here, there is one cable 62 going to the winch through the sheaves 64.

Figure 7:
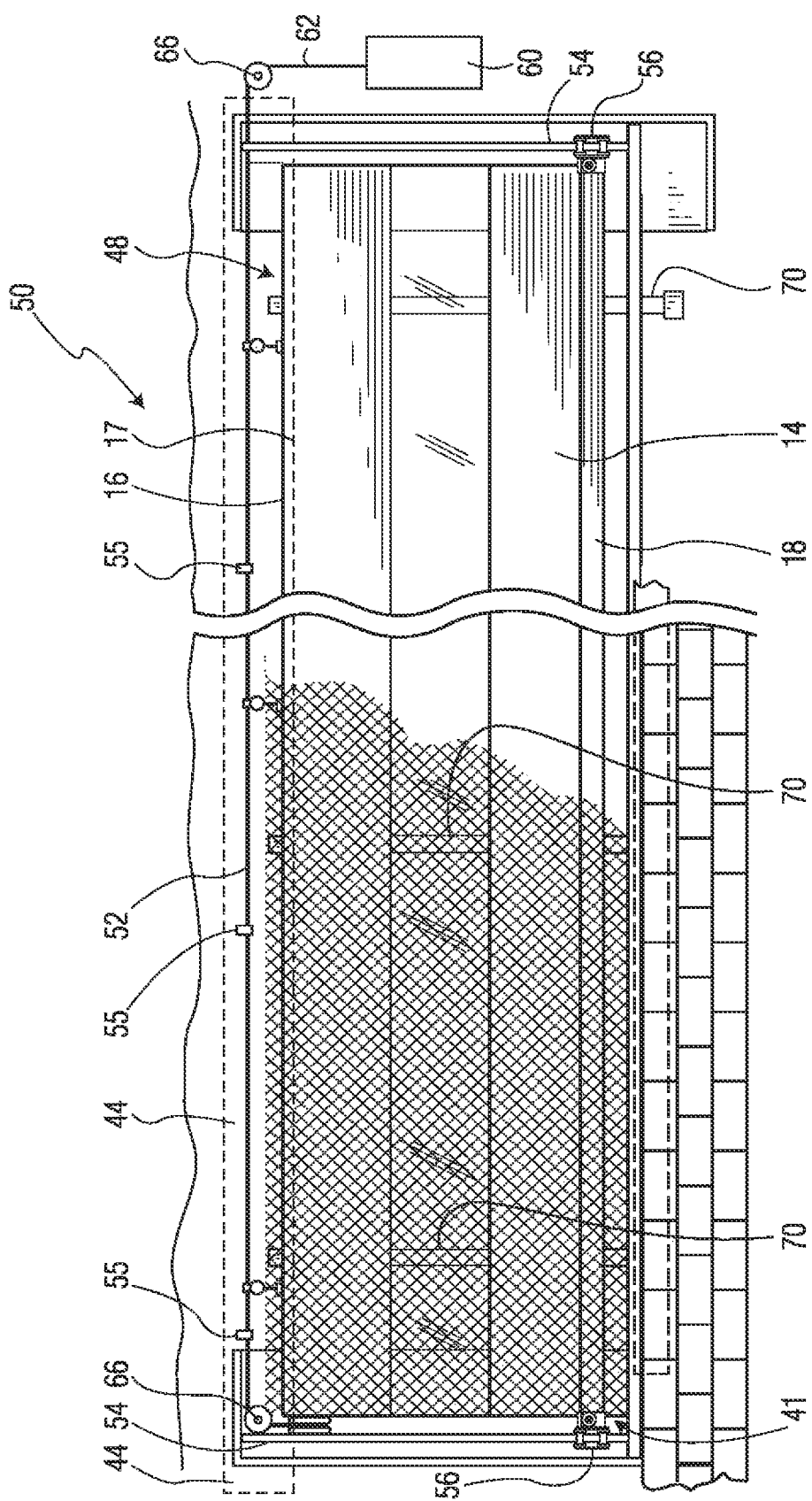
FIG. 7 is a rear view of another embodiment of the retractable curtain assembly according to the invention.

As shown in FIG. 7, another embodiment of the invention is shown, wherein the retraction system 50 further includes a pair of outer support rods 54, and a plurality of outer brackets 55, a pair of rolling mechanisms 56, and a winding device 58.

As shown in the Figures, the pair of outer support rods 54 are structural members, such as rigid poles, positioned along and fixed to the pair of outer walls 42. In the shown embodiment, each outer support rod is a cylindrical pole secured to one of the outer walls using a plurality of outer brackets 55 positioned at opposite ends thereof.

As shown, the pair of rolling mechanisms 56 includes a set of rollers positioned around and corresponding to the pair of outer support rods 54. Each rolling mechanism 56 is free to move up and down the pair of outer support rods 54.

As shown, the winding device 58 is connected to one of the rolling mechanisms 56, along one side of the pair of outer support rods 54. In the shown embodiment, the rolling mechanisms 56 is a roll-up mechanism, that is, a device for winding up the curtain 14 about the lower curtain support 18. The lower curtain support 18 is connected to the winding device 58, so as to rotate when the winding device is rotated, for instance, using the roll-up mechanism.

As shown in the FIGS. 1-6, anti-billowing straps 70 are provided and configured as generally shown. The strap 70 itself may be a woven web or other suitable material and is attached at the upper frame 44 by means of a strapping bracket 72, which also serves a stand-off to create a space between the strap 70 and the outward facing side of the upper frame 44. The lower end of the strap 70 is attached in various ways, including attached to the lower frame 46. The curtain 14 can be restrained with the strap 70 preventing billowing inward or outward.

Now with reference to the FIGS. 1-8, operation of the retractable curtain assembly will be discussed. As shown in FIG. 1, the curtain 14 is movable between a retracted position X (see FIG. 4) and an extended position Y (see FIG. 4) to control the amount of light entering the livestock structure. According to the invention, the curtain 14 includes at least one flexible transparent panel 12 connected to at least one flexible non-transparent panel 13.

Figure 4:
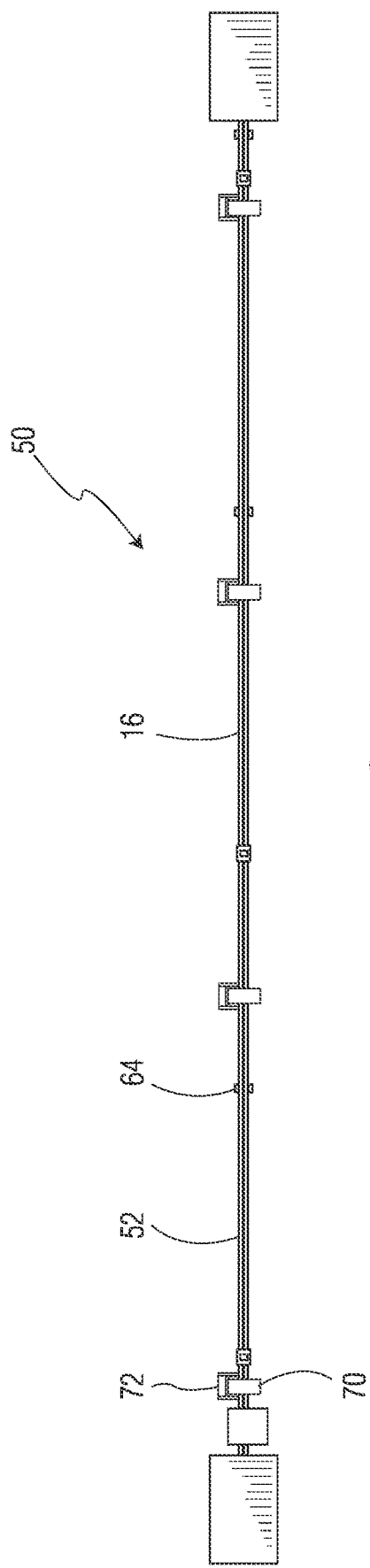
FIG. 4 is a top view of the retractable curtain system of FIG. 1.
Figure 5:
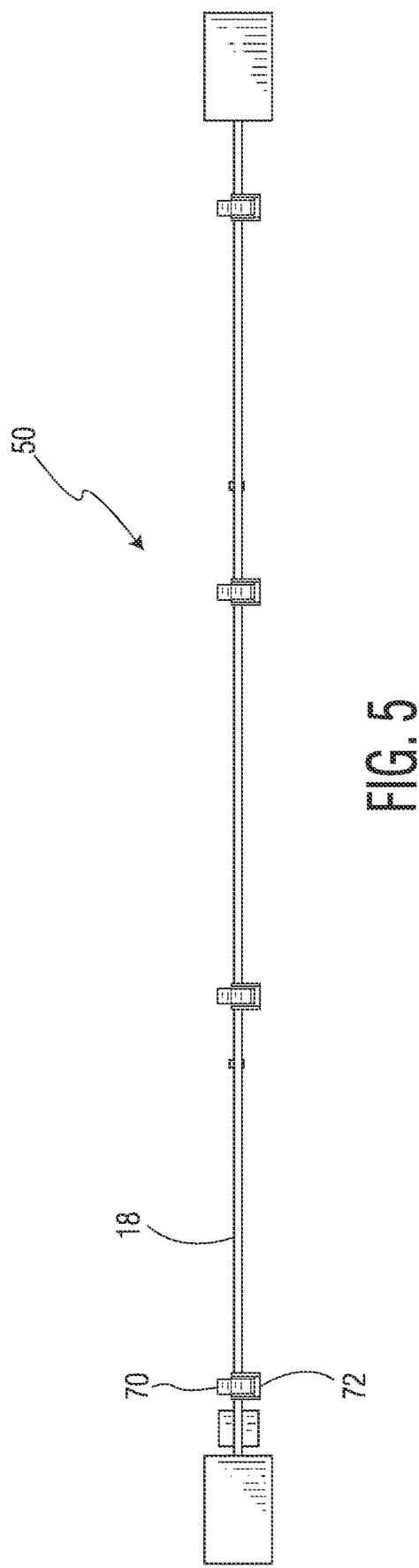
FIG. 5 is a bottom view the retractable curtain system of FIG. 1.

As shown in FIG. 1-3, when the curtain 14 is extended as fully as possible, light is allowed into the interior of the structure at the same time that there is a barrier to the free flow of wind and other undesirable environmental conditions into and out of the structure. As shown in FIG. 4, the curtain 14 is hoisted into a storage position. The curtain 14 is wound and stored at the general height of the upper framing 44, where the retraction system 50 is attached to the structure. The curtain 14 can be extended or rolled up depending on the weather and the conditions inside the structure. As an option, the curtain 14 may be rolled up partially. A worker may easily crank the curtain 14 using the lifting mechanism 60. The upper curtain support 16 raises the curtain 14 to the upper support rod 52. The worker uses the lifting mechanism 60 to lift or lower the curtain using the hoisting cable 62 that is attached to the upper curtain support 16 and drawn through the pulleys 66. At a change of conditions, it is also a simple matter to wind up the curtain 14 for storage using the retraction system 50.

Figure 6:
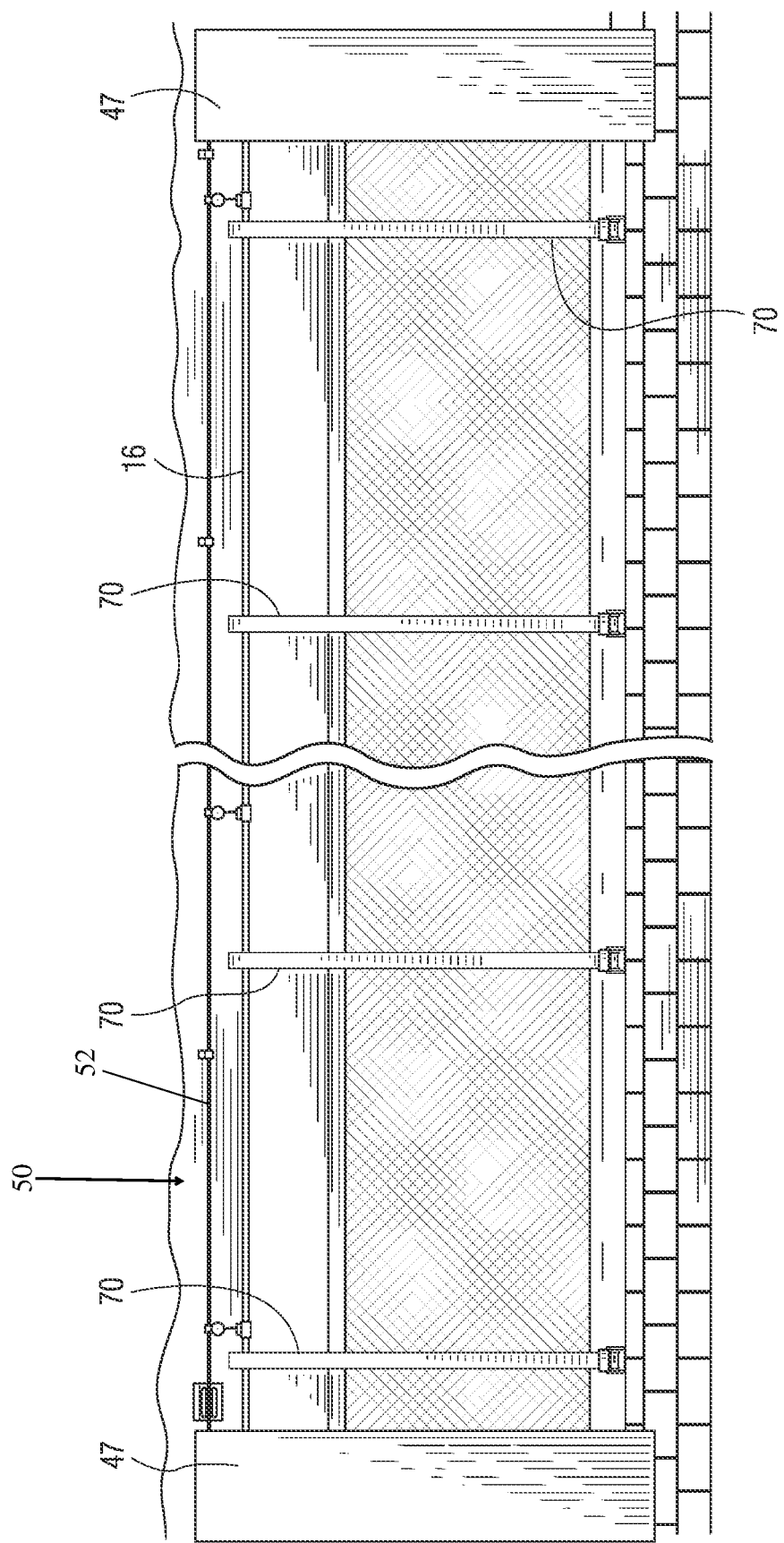
FIG. 6 a rear view of the retractable curtain system of FIG. 1, showing a curtain in a retracted position.
Figure 8:
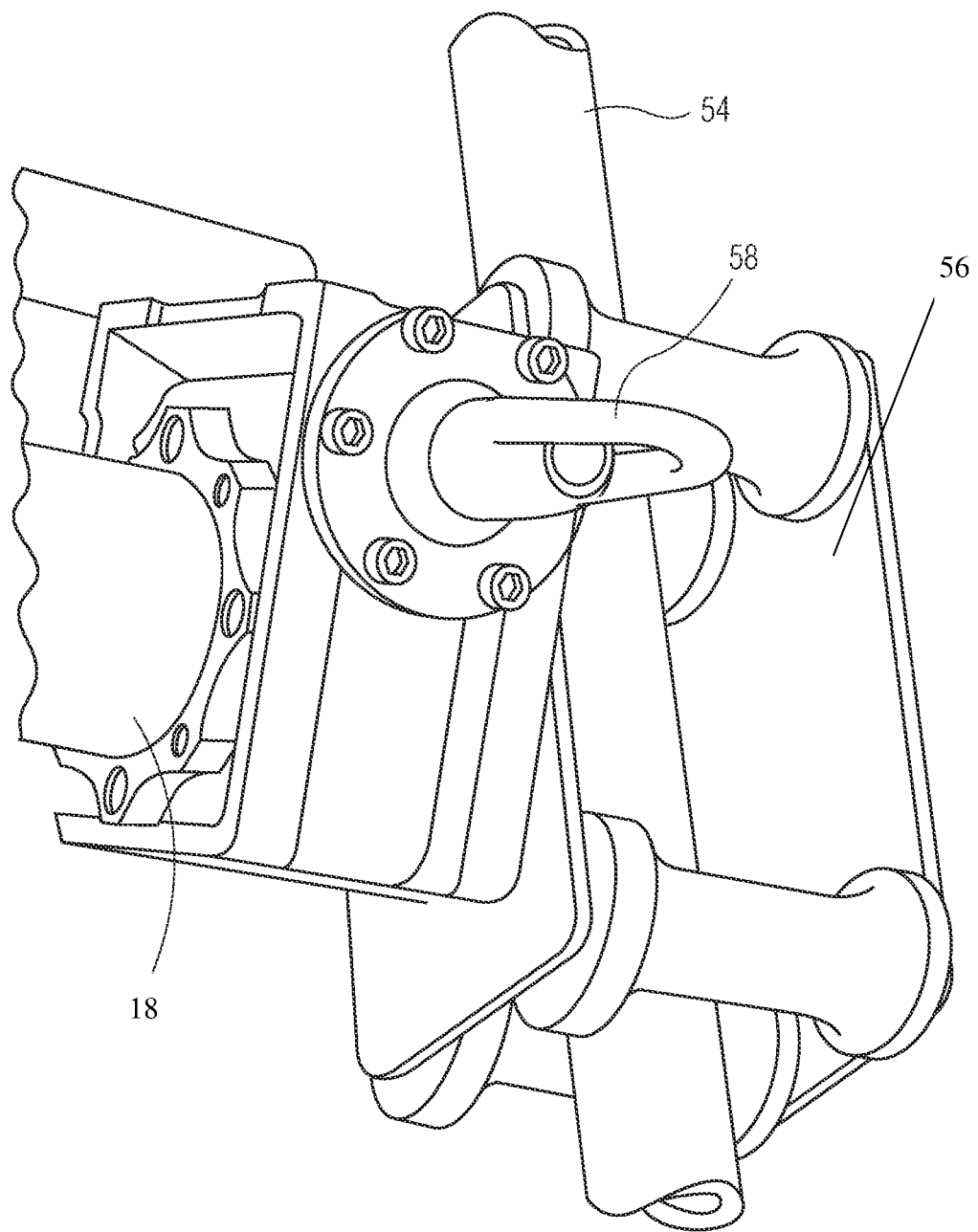
FIG. 8 is a perspective view of the rolling assembly of the retractable curtain system of FIG. 1.

In addition, as shown in FIG. 6-8, the curtain 14 can then be wound upward from the lower curtain support 18 using the winding device 58. The worker uses the winding device 58 to rotate the lower curtain support to wind up the curtain 14 about the lower curtain support 18. Accordingly, the lower curtain support 18 steadily scales up the outer support rods 54 using the rolling mechanisms 56 that are also attached to the winding device 58 (see FIG. 6).

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A retractable curtain system, comprising:
  a curtain support system having a pair of outer walls and an upper frame that define a curtain receiving space;
  a curtain capable of covering an entirety of the curtain receiving space and having:
    a first non-transparent panel connected to an upper curtain support, the upper curtain support at a first end of the curtain and a lower curtain support supported by the curtain and positioned at a second and opposite end of the curtain;
    a transparent panel extended horizontally and directly welded to the first non-transparent panel; and
    a second non-transparent panel connected to the transparent panel and positioned opposite the first non-transparent panel and directly welded to the transparent panel;
  wherein the transparent panel is movable up and down along the curtain receiving space such that the curtain maintains complete coverage across the curtain receiving space;
  a retraction system connected to the curtain to lower and raise the transparent panel up and down, the retraction system is configured to roll and unroll the curtain about the lower curtain support.

2. The retractable curtain system according to claim 1, wherein the upper curtain support is secured to the first non-transparent panel and the lower curtain support is secured to the second non-transparent panel.

3. The retractable curtain system according to claim 2, wherein the retraction system further includes a lifting mechanism having a winch and a hoisting cable connected to the curtain for raising and lowering the curtain.

4. The retractable curtain system according to claim 3, wherein the retraction system further includes an upper support rod positioned on the upper frame and supporting the hoisting cable.

5. The retractable curtain system according to claim 4, wherein the retraction system further includes a pair of outer support rods positioned along the pair of outer walls and configured to direct raising and lowering of the lower curtain support.

6. The retractable curtain system according to claim 5, further comprising a pair of rolling mechanisms having a set of rollers positioned around and corresponding to the pair of outer support rods and connected to the lower curtain support.

7. The retractable curtain system according to claim 6, further comprising a winding device connected to and configured to rotate the lower curtain support.

8. The retractable curtain system according to claim 7, wherein the winding device is connected to one of the pair of rolling mechanisms along one side of the pair of outer support rods.

9. The retractable curtain system according to claim 8, wherein the winding device is a roll-up mechanism for winding up the curtain about the lower curtain support.

10. The retractable curtain system according to claim 1, wherein the first non-transparent panel and the transparent panel are each formed of a plastic material.

11. The retractable curtain system according to claim 1, wherein the first non-transparent panel is translucent.

12. The retractable curtain system according to claim 1, wherein the transparent panel is horizontally positioned between the first non-transparent panel and the second non-transparent panel.

13. The retractable curtain system according to claim 12, wherein the first non-transparent panel is a rectangular section of material positioned along an upper half of the curtain.

14. The retractable curtain system according to claim 13, wherein the transparent panel is a rectangular section of material having a light transmittance greater than 90%.

15. The retractable curtain system according to claim 1, wherein a plurality of window framing is positioned adjacent the transparent panel.

* * * * *